Nov. 12, 1963 W. R. SMITH-VANIZ ETAL 3,110,864
FAST-RESPONSE AND SLOW-DECAY AUTOMATIC GAIN CONTROL AND SYSTEM
Filed April 19, 1960
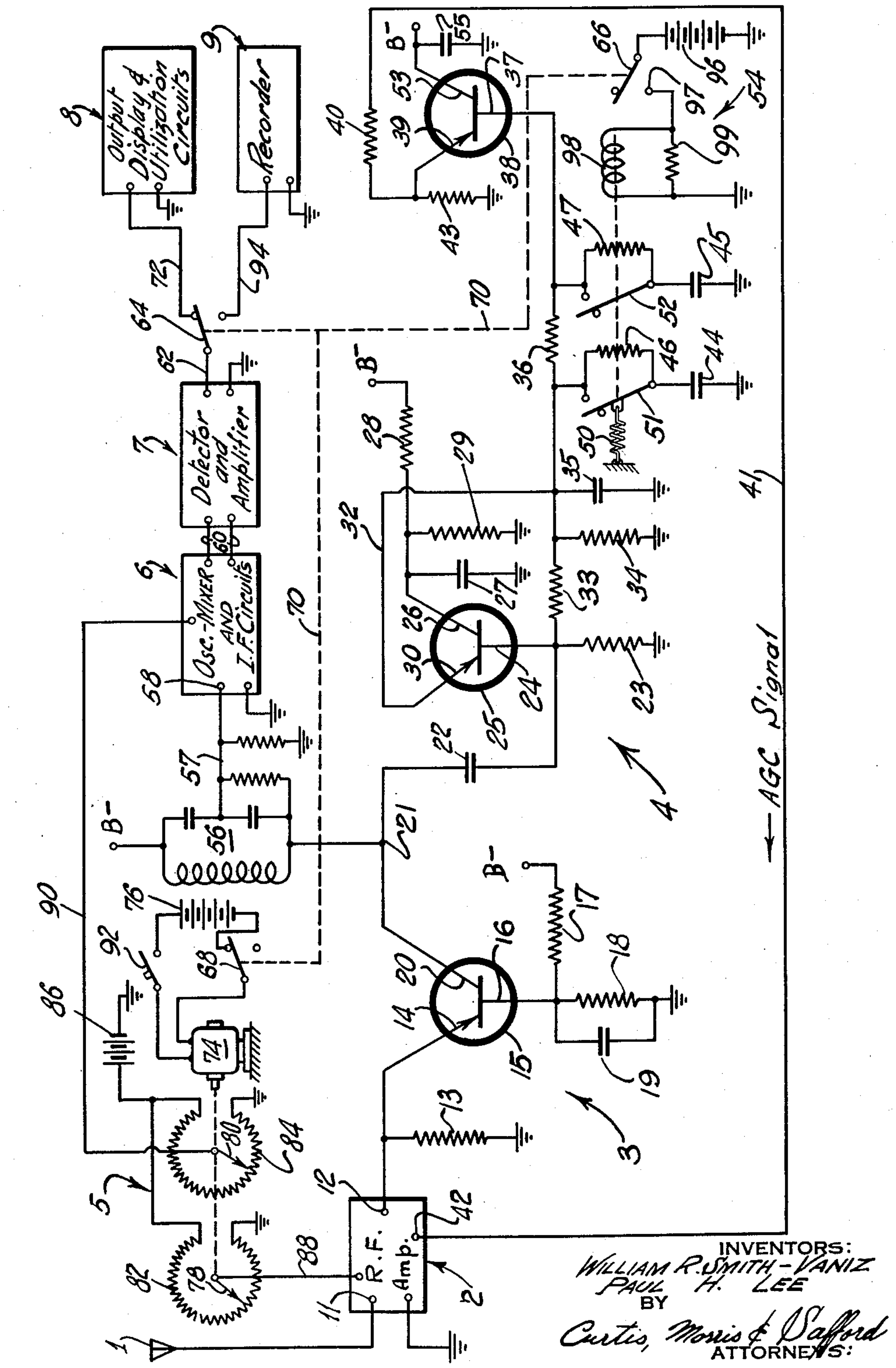
INVENTORS:
WILLIAM R. SMITH-VANIZ
PAUL H. LEE
BY
Curtis, Morris & Safford
ATTORNEYS:

United States Patent Office 3,110,864
Patented Nov. 12, 1963

3,110,864

FAST-RESPONSE AND SLOW-DECAY AUTOMATIC GAIN CONTROL AND SYSTEM

William R. Smith-Vaniz and Paul H. Lee, Norwalk, Conn., assignors to Trak Electronics Company, Inc., Wilton, Conn.

Filed Apr. 19, 1960, Ser. No. 23,250
9 Claims. (Cl. 325—319)

The present invention relates to fast-response and slow-decay automatic gain control circuits and systems utilizing automatic gain control. More particularly, this invention relates to such circuits and systems which are actuated by the peak value of the signal being received. In the radio receiver system which is described herein as illustrative of the present invention provision is made for making a recording of the incoming radio signal whenever desired, and the characteristics of the automatic gain control circuit can be changed during recording away from its normal fast-response and slow-decay action so as to provide a slow-response and slow-decay action for preserving all of the characteristics of the received signal for recording purposes.

Among the many advantages of the radio receiver system which is described herein as illustrative of the present invention are those resulting from the efficient automatic gain control operation which is adapted for the reception of many different types of radio signals, even including pulse-type signals of short duration and widely varying repetition rate.

In this specification and in the accompanying drawing is described and shown an automatic gain control circuit and receiver system embodying this invention, but it is to be understood that this example is not intended to be exhaustive nor limiting of the invention. This illustration of the invention is given in order that others skilled in the art may modify and adapt it in various forms, each as may be best suited to the conditions of a particular use.

The various objects, aspects and advantages of the present invention will be more fully understood from a consideration of the following specification in conjunction with the accompanying drawing. This drawing is a schematic circuit diagram of a search receiver system incorporating a fast-response and slow-decay automatic gain control detector circuit.

This receiver system comprises generally the following components, circuits and stages: an antenna 1, radio-frequency amplifier stage 2, a transistor amplifier coupling stage 3, an automatic gain control circuit 4, a cyclic sweep tuning control 5, oscillator-mixer and intermediate-frequency amplifier circuits 6, detector and power amplifier circuits 7, output display and utilization circuits 8, and recording equipment 9.

In operation the incoming radio signals, for example, such as a sequence of pulses are picked up by the antenna 1 and are fed into the input terminal 11 of the radio-frequency amplifier circuit 2. The amplified signals are supplied from a terminal 12 and are fed across a grounded resistor 13 to the emitter 14 of a transistor 15 in the stage 3. A suitable operating bias voltage for the base electrode 16 is provided by a pair of resistors 17 and 18 connected in series between the negative supply source B− and the common return connection or ground, with a capacitor 19 shunted across the base resistor 18.

From the collector 20 of the transistor 15 the amplified signal is supplied to a terminal 21 and is coupled through a capacitor 22 and applied across a resistor 23 to the base electrode 24 of a transistor 25 in the automatic gain control circuit 4. The transistor 25 has its collector electrode 26 coupled to the common return circuit, i.e. "to ground," by a capacitor 27, and suitable voltage for this collector is provided by a pair of resistors 28 and 29 in series between the B− terminal and the return circuit.

In order to obtain an automatic gain control signal which is peak-actuated and has a fast rise time and a slow decay, the emitter 30 of this transistor 25 is connected back to the base 24 through a coupling loop comprising a lead 32 and a resistor 33. A capacitor 35 shunted by a resistor 34 is connected to ground from the junction of the lead 32 and the resistor 33.

In the absence of any incoming signal, the emitter 30 is at a voltage slightly negative with respect to the base 24 so that the transistor 25 is normally cut-off from conduction. When the reception of a radio signal commences, alternate half-cycles initially drive the base 24 in a negative direction with respect to the emitter 30, because the capacitor 35 initially tends to hold the emitter at its original voltage. Consequently, the collector 26 is caused to conduct strongly, thus drawing current up through the base resistor 23, and this current in turn drives the base 24 further negative.

As a result of this feedback action, the voltage at the base electrode 24 rapidly moves in the negative direction. This negative-going voltage is fed through a resistor 36 to the base electrode 37 of a transistor 38 which is operated as a grounded-collector stage. Therefore, the voltage at its emitter 39 is rapidly pulled in a negative direction, feeding a negative-going voltage through a resistor 40 and along a lead 41, forming the automatic gain control signal. This signal is fed to the gain control terminal 42 in the radio-frequency amplifier circuit 2. The emitter 39 is connected to ground through a resistor 43, and the collector 53 is effectively tied to ground by a capacitor 55 and is connected to the B− terminal.

This AGC circuit 4 has a very quick response to the reception of a radio signal as a result of the regenerative feedback action caused by current flow through the base resistor 23 and the action of capacitor 35 in association with the coupling loop 32, 33. Moreover, the AGC circuit responds to the peak values of the incoming signals, for it is the peak values which initially cause the conduction through the base electrode 24.

It will be appreciated that many pulse-type radio signals are of very short duration with relatively long periods of time or spaces between each pulse and between each group of pulses. For the reception of such signals it is desirable that the automatic gain control circuit should respond quickly, as described above, so as to provide a very rapid adjustment of the gain level to the particular value of gain required for the groups of pulses being received. Similarly, this rapid AGC response is desirable for the reception of many other types of intermittent signals.

In addition, during the spaces or pauses between intermittent signals, it is desirable that the automatic gain control should retain its adjusted value temporarily so as to be prepared for the succeeding signal in a group, on the probability that the next signal in a group will have approximately the same energy as previous ones. Thus, a slow decay of the AGC voltage on the lead 41 is desired following the reception of a radio signal.

A relatively slow decay in the AGC voltage is obtained by virtue of the fact that the capacitor 35 becomes negatively charged during the reception of a signal and so do a pair of capacitors 44 and 45 which are connected through resistors 46 and 47, respectively, with opposite sides of the resistor 36 in a pi-network. These three capacitors tend to maintain the AGC signal after the input radio signal has ceased. This slow-decay operation desirably tends to maintain the gain setting at a proper value for receiving subsequent pulses in a radio signal after the first pulse is received.

During this slow-decay AGC operation, a spring 50 holds the contact arms 51 and 52 of the relay 54 in their left or open positions as shown.

The amplified signal being received is fed from the collector 20 of the stage 3 through a coupling circuit 56 and through a lead 57 into the input terminal 58 of the oscillator-mixer and intermediate frequency stages 6. An intermediate-frequency signal resulting therefrom is supplied through the connections 60 to the detector and power amplifier stages 7. The output from the detector and amplifier 7 is supplied through a connection 62 to a switch arm 64 of a ganged switch including two other switch arms 66 and 68, all of which are mechanically interconnected by a suitable linkage 70 so that they move in unison.

When the receiver is being operated as a search receiver for locating any signals which may be present within a predetermined portion of the radio-frequency spectrum, the switch arms 64, 66 and 68 are all in their upper positions, as shown. Accordingly, the output from the detector and amplifier stages 7 is fed through a connection 72 into suitable output display and utilization circuits 8, which, for example, may include a cathode ray tube display and a loudspeaker.

During operation as a search receiver, a sweep control motor 74 is energized through the switch arm 68 from an electrical power source 76. This motor cyclically drives a pair of rotatable contact arms 78 and 80 in unison along a pair of circular potentiometers 82 and 84, respectively, which are energized from an electrical power source 86. Thus, the rotatable contact arms 78 and 80 serve to supply cyclically changing control voltages through leads 88 and 90, respectively, to the r-f amplifier circuits 2 and to the oscillator, mixer and intermediate-frequency circuits 6. Each of these circuits 2 and 6 contain controllable inductance tuning apparatus, for example, such as is shown in U.S. Patent No. 2,911,529 issued Nov. 3, 1959. The cyclically varying search control voltages being supplied through the connections 88 and 90 operate the inductance tuning apparatus therein as will be understood, and thus produce a cyclical change in the frequency to which the receiver is tuned. Consequently, the receiver system repeatedly sweeps, or scans, throughout its assigned band of frequencies.

Whenever a signal is received at any time during the searching operation, which is of interest to the operator, then he may stop the scanning by opening a sweep stop switch 92 in the motor energization circuit. This stops the rotating contacts 78 and 80 and provides fixed voltages over the control lines 88 and 90 so as to hold the receiver system tuned to the desired frequency at which the signal is being received. In this way the operator may continue to observe and utilize this signal in the output display and utilization circuits 8.

During searching operation as described above, or during operation while tuned to a particular frequency by opening the switch 92, the fast-response automatic gain control is in operation to accommodate quickly for any changes in signal level which happen to occur.

Under recording conditions of operation it is desirable to use a much slower-acting gain control. Any sudden changes in signal level are thereby accurately recorded by the recorder apparatus, such as a magnetic tape recorder, so as to preserve the maximum amount of information or intelligence concerning the signal being received and recorded. It will be noted that the resistor 36 and the associated capacitors 44 and 45 effectively provide a pi-filter section. For fast-response AGC, the pair of resistors 46 and 47 are in circuit in series with these capacitors 44 and 45. These resistors 46 and 47 are of relatively high resistance value so that their presence substantially removes any delay effect from the presence of these capaictors 46 and 47, and accordingly the fast-response is provided.

In the event that the operator wishes to record the incoming signal, then he actuates the switch arm 64 into its lower position so as to complete a circuit from the amplifier 7 through a lead 94 into the recording apparatus 9. At the same time the linkage 70 moves the switch arm 68 down so as to deenergize the motor to stop the frequency scanning operation, and the switch arm 66 engages a contact 97 to complete a circuit from an electrical power source 96 through a control winding 98 of the relay 54, having a resistor 99 shunted thereacross.

Upon energization of the solenoid 98, the switch arms 51 and 52 move to their closed positions so as to by-pass the resistors 46 and 47. Thus, the pi-filter section 44, 36, 45 is brought into full effect. Thus, the AGC action is slowed down. Also, the rate of decay is also slowed down, as is desired, because of the increased storage effect of the capacitors 44 and 45. In this way, the gain control response curve remains of the same desirable shape for receiving pulse-type radio signals.

In the schematic circuit diagram the $B^-$ terminal is one terminal of a suitable source of electrical power for energizing the receiver system, such as a rectifier-filter power supply, and the other terminal of this source is connected to the common return circuit.

From the foregoing it will be understood that the present invention as described above is well suited to provide the advantages set forth. It will be appreciated from the foregoing that many possible embodiments may be made of the various features of this invention and the apparatus herein described may be varied in various parts, all without departing from the scope of the invention, and that all matter hereinbefore set forth or shown in the accompanying drawing is to be interpreted as illustrative and not in a limiting sense, and that, in certain instances, some of the features of the invention may be used without a corresponding use of other features, all without departing from the scope of the invention.

We claim:

1. A fast-response and slow-decay automatic gain control system for a radio receiver circuit comprising radio receiver circuit means, a transistor having emitter, collector, and base electrodes, a first resistor connected to the base electrode, an energization circuit for said transistor including a source of electrical power, a first side of said source being connected to the collector electrode and the second side of said source being connected to the base electrode through said resistor, first circuit means connected from said receiver to the base electrode for feeding received signals to said base electrode, a second and a third resistor connected in circuit in serial relationship between the base electrode and the second side of said source with said second resistor being connected in said circuit intermediate said base electrode and said third resistor, a capacitor shunting said third resistor, and second circuit means extending from the emitter to a point in said circuit between said second and third resistors for providing a regenerative feedback path between said emitter and said base electrodes, said second circuit means normally biasing said emitter to cut off conduction in the transistor in the absence of any received signals, and third circuit means connecting said point to a gain control terminal in the receiver circuit for automatically controlling the gain thereof.

2. A fast-response and slow-decay automatic gain control system for a radio receiver circuit comprising a transistor having emitter, collector, and base electrodes, resistance means connected to the base electrode, an energization circuit for said transistor including a source of electrical power, a first side of said source being connected to the collector electrode and the second side of said source being connected to the base electrode through said resistance means, an input circuit connected to the base electrode for feeding received signals to said base electrode, capacitance means connected from the second side of said source to said resistance means at a point intermediate the ends of said resistance means, a direct connection extending from the emitter to said point for biasing said emitter to cut-off in the absence of any received signals and for providing a regenerative feedback path between said emitter and said base electrodes, thereby to produce a fast-response to any received signal, and an output circuit connected to said point for supplying automatic gain control signal, said capacitance means temporarily maintaining said automatic gain control signal after said received signal has ceased, whereby to produce a slow-decay of the automatic gain control action.

3. A fast-response and slow-decay automatic gain control circuit comprising a transistor having at least emitter, collector, and base electrodes, resistance means connected to the base electrode, an energization circuit for said transistor including a source of electrical power, a first side of said energization circuit being connected to the collector electrode and the second side of said energization circuit being connected to the base electrode through said resistance means, capacitance means connected from the second side of said energization circuit to said resistance means at a point between the opposite ends of said resistance means, an input connection to the base electrode for feeding signals to said base electrode, a direct regenerative feedback connection extending from the emitter to said point, and an output connection from said point for supplying gain control signals resulting from signals in said input connection.

4. A fast-response and slow-decay automatic gain control system comprising a transistor having emitter, collector, and base electrodes, first resistance means connected to the base electrode, second resistance means connected in series with said first resistance means, a source of electric power having one side connected to said collector and having its second side connected to said second resistance means on the opposite side thereof from said first resistance means for energizing the collector-to-base path of said transistor through said first and second resistance means, capacitance means shunting said second resistance means, a regenerative feedback circuit extending from said emitter to the junction of said first and second resistance means, and input connection to said base electrode, an output connection from said junction of said first and second resistance means, second capacitance means, and switch means for connecting said second capacitance means effectively in parallel with said first capacitance means for slowing down the response and increasing the slow-decay.

5. A fast-response and slow-decay automatic gain control system as claimed in claim 4 and including third resistance means in serial relation with said output connection, third capacitance means having one end connected to the second side of said source of electric power, and second switch means for the connecting the other end of said third capacitance means to a point between said output connection and said third resistance means.

6. An automatic gain control radio receiver recording system comprising a receiver circuit having an output, recording mechanism, first switch means connected to said output and having first and second operating conditions, said first switch means when in said first condition arranging said recording mechanism for recording signals appearing at said output and when in said second condition discontinuing the recording operation, an automatic gain control system in said receiver, a filter circuit in said gain control system, second switch means connected to said filter circuit for controlling the rate of response of said automatic gain control system, said second switch means having first and secnd operating conditions and when in said first condition arranging said filter circuit for faster response and when in said second condition arranging said filter circuit for slower response, and control means connected to said first and second switch means for placing said second switch means in its first condition whenever said first switch means is in its first condition, and for placing said second switch means in its second condition whenever said first switch means is in its second condition.

7. An automatic gain control system for a radio receiver which includes recording apparatus comprising a radio receiver circuit having an output, first switch means for connecting said recording apparatus to said output, a transistor having emitter, collector, and base electrodes, first resistance means connected to the base electrode, an energization circuit for said transistor including a source of electrical power, a first side of said energization circuit being connected to the collector electrode and the second side of said energization circuit being connected to the base electrode through said resistance means, a signal input connection from said receiver to the base electrode for feeding received signals to said base eletcrode, a capacitor shunting a portion of said resistance means spaced from the base electrode, feedback circuit means extending from the emitter to a point in said resistance means spaced from the base electrode, an output circuit connected to said point, a second capacitor, second switch means for connecting said second capacitor in shunt with said output circuit, and control means interconnecting said first and second switch means for connecting said second capacitor in shunt with said output circuit when said recording apparatus is connected to said output.

8. A fast-response and slow-decay automatic gain control radio receiver system comprising a radio receiver circuit having a gain control terminal; recording equipment; first switch means for placing said recording equipment into and out of operation for recording received signals whenever desired; an automatic gain control system connected to said receiver circuit including a transistor having base, emitter, and collector electrodes; an input circuit connected to the base of said transistor for feeding received signals thereto; a source of direct power having first and second terminals, said first terminal being connected to said collector; a first resistor connected in circuit in serial relationship between said second terminal and said base electrode; a second and third resistor connected in circuit in serial relationship between said second terminal and said base electrode, said second resistor being in circuit nearer to said base electrode than said third resistor; a first capacitor shunting said third resistor; electrical circuit means connected from said emitter electrode to a point between said second and third resistors for providing a feedback loop from said emitter electrode to said point; a $\pi$-filter network including a fourth resistor in circuit in serial relationship between said point and said gain control terminal, a second capacitor having one side connected to one side of said fourth resistor, a fifth resistor connected to the opposite side of said second capacitor, a third capacitor having one side connected to the opposite side of said fourth resistor from said second capacitor, a sixth resistor connected to the opposite side of said third capacitor; second switch means operable to by-pass said fifth and sixth resistors; and control means arranged to operate said second switch means when said first switch means are operated for recording received signals.

9. A fast-response and slow-decay automatic gain control system for a receiver circuit comprising a transistor having at least emitter, collector and base electrodes, a source of electrical power having a common return, resisance means in circuit between said base electrode and said common return, circuit means connecting said course to the collector electrode, an input circuit connected to said base eletrode for feeding received signals to said base electrode, an output circuit connected to said emitter for supplying the automatic gain control signal produced by said system, said emitter electrode being normally biased to cut-off conduction through said transistor in the absence of any received signal, second resistance means connected directly between said base electrode and said emitter electrode for providing a regenerative feedback path between said emitter and base electrodes, thereby producing a rapid increase in conduction through said transistor upon the appearance of a received signal at said base electrode, whereby a rapid AGC control action is provided, a capacitor connected between said emitter electrode and said common return, and third resistance means shunting said capacitor for slowly changing the charge on said capacitor for producing a slow decay in the AGC signal upon the disappearance of the received signal.

References Cited in the file of this patent

UNITED STATES PATENTS

| | | |
|---|---|---|
| 2,719,222 | Barr | Sept. 27, 1955 |
| 2,807,718 | Chressanthis et al. | Sept. 24, 1957 |
| 2,834,878 | Burns | May 13, 1958 |
| 2,882,350 | Stern et al. | Apr. 14, 1959 |
| 2,950,356 | Stott | Aug. 23, 1960 |
| 2,957,074 | Trevor | Oct. 18, 1960 |

FOREIGN PATENTS

| | | |
|---|---|---|
| 825,276 | Great Britain | Dec. 16, 1959 |